United States Patent [19]
Josefsson

[11] Patent Number: 5,380,243
[45] Date of Patent: Jan. 10, 1995

[54] AIR SUPPLY HOUSING ARRANGEMENT FOR PAINT SPRAY BOOTHS

[75] Inventor: Leif E. B. Josefsson, Sterling Heights, Mich.

[73] Assignee: ABB Flakt Aktiebolag, Stockholm, Sweden

[21] Appl. No.: 919,918

[22] Filed: Jul. 27, 1992

[51] Int. Cl.⁶ .............................................. B05B 15/12
[52] U.S. Cl. ........................................ 454/52; 454/54
[58] Field of Search ..................... 454/50, 51, 52, 53, 454/54

[56] References Cited

U.S. PATENT DOCUMENTS

| | | | |
|---|---|---|---|
| 3,391,630 | 7/1968 | Wilhelmsson | 454/52 |
| 3,421,293 | 1/1969 | Halls | 55/223 |
| 3,516,230 | 6/1970 | Saubesty | 454/54 X |
| 3,561,135 | 2/1971 | Fulford | 34/224 |
| 3,803,997 | 4/1974 | Van Raden | 454/54 |
| 4,440,554 | 4/1984 | Perry | 55/241 |
| 4,537,120 | 8/1985 | Josefsson | 454/52 |
| 4,687,686 | 8/1987 | Stofleth et al. | 454/52 X |
| 4,885,010 | 12/1989 | Rich et al. | 454/54 X |
| 4,952,221 | 8/1990 | Morioka | 454/51 |
| 5,147,422 | 9/1992 | Neeley et al. | 454/52 X |

FOREIGN PATENT DOCUMENTS

| | | | |
|---|---|---|---|
| 415511 | 3/1991 | European Pat. Off. | 454/52 |
| 3134248 | 3/1983 | Germany . | |
| 1080702 | 8/1967 | United Kingdom . | |

*Primary Examiner*—Harold Joyce
*Attorney, Agent, or Firm*—Harness, Dickey & Pierce

[57] ABSTRACT

An air supply housing arrangement for a paint spray booth is located at an elevation in the booth such that the air flowing through a booth paint spray zone is processed below a level of water held in a booth recirculation tank.

10 Claims, 4 Drawing Sheets

AIR SUPPLY HOUSING ARRANGEMENT FOR PAINT SPRAY BOOTHS

BACKGROUND OF THE INVENTION

The present invention relates to a scrubber water handling system and air supply housing arrangement for a paint spray booth and, more particularly, to a scrubber water handling system and air supply housing arrangement contained in a paint spray booth bottom tank.

Air and water recirculation/filtration systems are important for industrial paint spray booths as they provide for acceptable environmental conditions and high quality paint finishing. In a traditional paint spray booth, residual paint spray and water is collected and transported to a recirculation tank external to the booth. Upon filtration, water is pumped back to the booth bottom. Filtered air is supplied to the spray booth from an air supply housing unit located on the roof of the building. Installation of these units is expensive as extensive labor and materials (i.e. piping and duct work) are required.

It is desirable to have a scrubber water handling system and air supply housing unit located within the paint spray booth bottom tank. This would result in substantial cost savings as the amount of materials and labor used in constructing external systems would be reduced as modular design units would be utilized. Additional cost savings would be realized as less pump energy would be required to recirculate the water. It is desirable to have one scrubber water handling system and air supply housing unit for every paint spray booth zone. This would eliminate the need for large units external to the paint spray booth to process the entire amount of water and air used in the paint spray process. Additionally, less water retention time is needed for each recirculation tank as opposed to one large external tank.

BRIEF DESCRIPTION OF THE DRAWING

The objects and features of the invention will become apparent from a reading of the detailed description, taken in conjunction with the drawings wherein similar reference numerals denote similar elements throughout the several views and in which.

DETAILED DESCRIPTION

Figure 1:
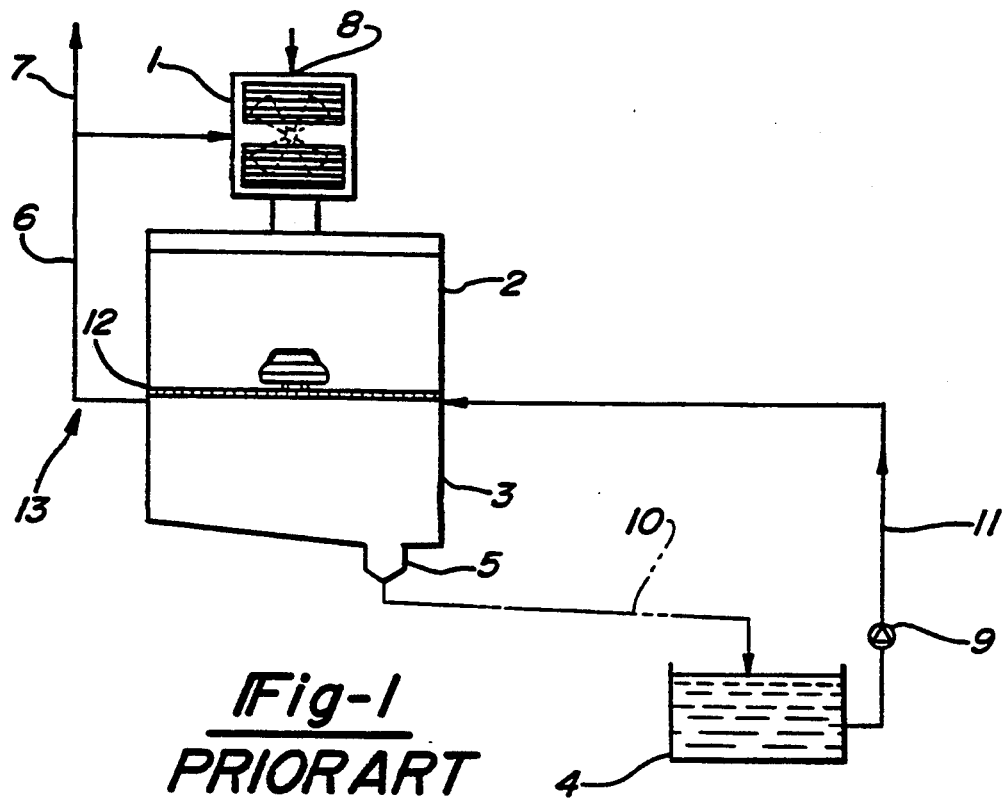
FIG. 1 is a side view of a prior art paint spray booth system consisting of an air supply housing unit, paint spray booth, spray booth bottom, and recirculation tank.

Referring now to FIG. 1 there is shown prior art spray booth system 13 which includes air supply housing unit 1, spray booth 2, spray booth bottom 3, and water recirculation tank 4. Water (containing a dilute concentration of paint) and air enter spray booth bottom 3. After passing through spray booth bottom 3, the water collects in trough 5 and passes under gravity through piping 10 to recirculation tank 4. Upon being filtered, pump 9 transports the water through pipe 11 to spray booth bottom 3. In regards to air recirculation, the air is exhausted through tank outlet 12 and duct 6 where it is either vented to the atmosphere at 7 or is recycled to air supply housing unit 1. If vented, fresh air is supplied via damper 8.

Several problems exist with the prior art. Construction of the recirculation tank and air supply housing unit is expensive and requires a high amount of materials and labor. A high level of pump energy is needed to transport the water back to the spray booth. Additionally, state regulations may require that the below-ground recycle tank be double contained.

In view of the above, an improved placement of the recirculation tank and the air supply housing unit is contemplated to eliminate the aforementioned difficulties encountered in the prior art system in FIG. 1.

Figure 2:
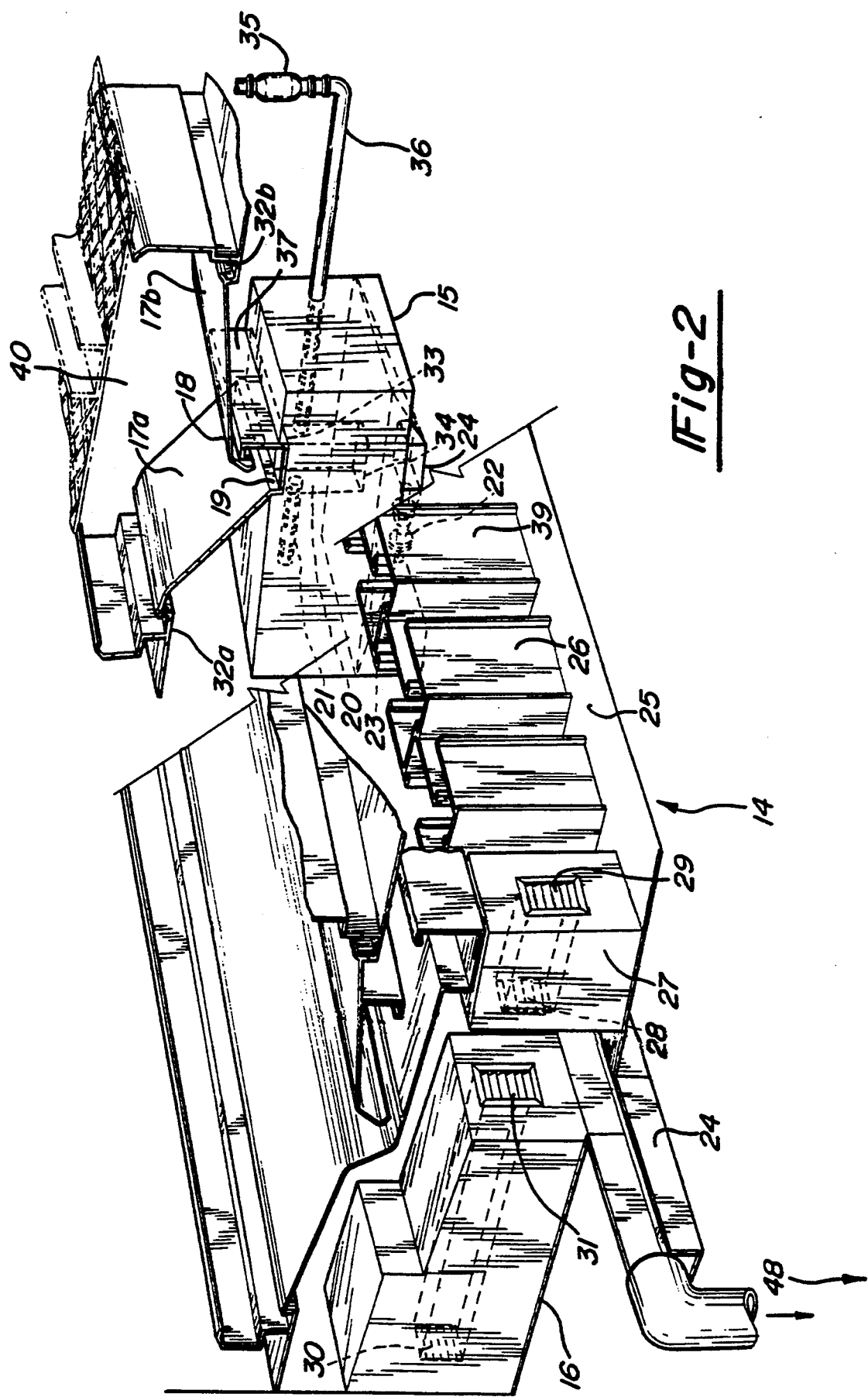
FIG. 2 is a perspective view of a paint spray booth bottom tank embodying the present invention.

Referring now to FIG. 2, a first preferred embodiment of the present invention is shown and includes recirculation tank 15 and air supply housing unit 16 contained in spray booth bottom zone 14. Rectangular recirculation tank 15 is located below flooding sheets 17a and 17b and venturi scrubber 18. Located within tank 15 is trough 19, chute 20, and horizontal slotted pipe 21. Flush-out valve 22 connects the tank bottom 23 to trough 24 which runs along tank bottom 25. Located between baffle 37 and air supply system 16 is labyrinth 26. Opposite air supply housing unit 16 is exhaust duct 27 with door 28 and damper 29. Dampers 30 and 31 are located on housing unit 16.

Water with is distributed in troughs 32a and 32b along spray booth bottom 33. The water flows by gravity on flooded sheets 17a and 17b and passes through venturi scrubber 18 into recirculation tank 15. The purpose of venturi scrubber 18 is to create a high level of turbulence, allowing the paint solids and water to thoroughly mix. As it enters the bottom section of the paint spray booth, water collects in trough 19. As trough 19 fills, the water enters chute 20 flowing through opening 33. Water then flows through open bottom 34 filling recirculation tank 15. Upon exiting opening 34, the water sweeps paint sediment up from tank bottom 23 forming an even distribution of water and paint solids. Large pieces of paint sludge will nonetheless settle in tank bottom 23. Flush-out valve 22 is opened periodically to remove and send such sludge pieces to desludging system 48 (FIG. 4) by way of trough 24. Recirculation pump 35 draws water through slotted pipe 21 and external pipe 36, sending it back to troughs 32a and 32b.

A small portion of water bypasses recirculation tank 15 and is not recycled in the manner described above. This portion (in the form of water droplets) is swept up by air entering tank 15 through venturi scrubber 18 and is carried over baffle 37. The air and water droplets enter the labyrinth 26. Water droplets contact labyrinth baffles 39 and fall to tank bottom 25. The droplets are collected in trough 24 where they are transported to desludging system 48.

The air approaches the end of the zone length near air supply housing unit 16 where it can either be recycled to paint spray booth 40 or exhausted to the atmosphere. If exhausted, it passes through door 28 into air duct 27. Damper 29 is connected to duct work which leads to an outside exhaust system. During this time fresh air enters air supply housing unit 16 through damper 30, is processed in air supply housing unit 16, and is sent to paint spray booth 40. During this time, damper 31 is closed.

During the recycle operation, dampers 29 and 28 are closed. Damper 31 is opened, allowing air to enter air supply housing unit 16. To prevent fresh air from entering, damper 30 is closed. Upon being processed, the recycled air is sent to the spray booth 40.

Figure 3:
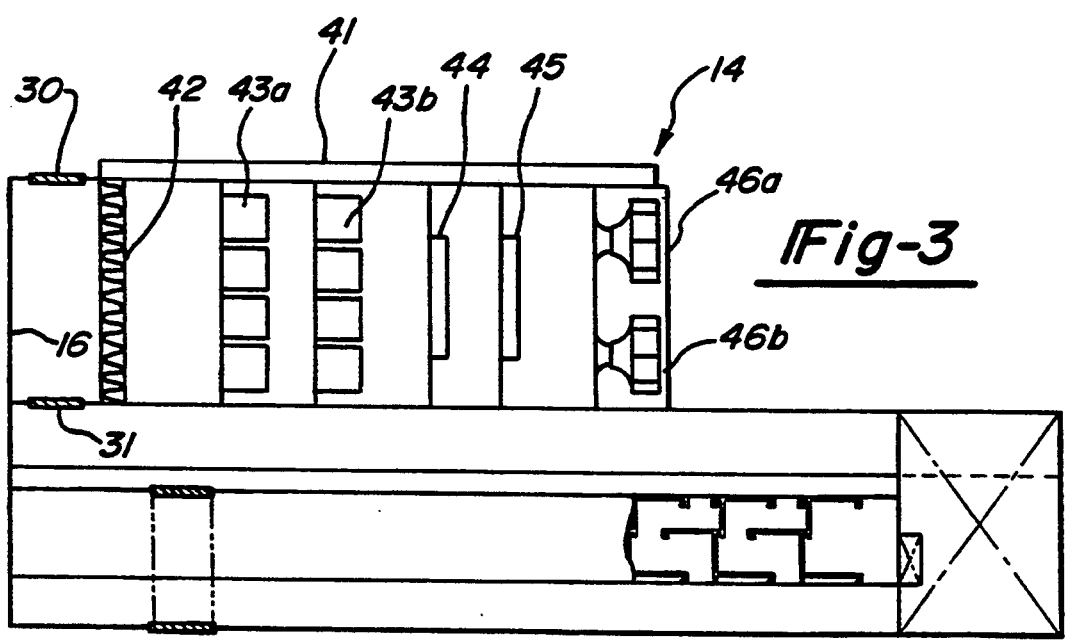
FIG. 3 is a top view of a section of the spray booth bottom tank illustrating the air supply housing unit labyrinth and recirculation tank.

FIG. 3 shows paint spray booth bottom zone 14 shown in FIG. 2 illustrating in detail air conditioning unit 41 located within air supply housing unit 16. Air conditioning unit 41 contains in series dewatering baffle arrangement 42, air particle bag filters 43a and 43b, dehumidification cooling unit 44, heater 45, and recirculation fans 46a and 46b. Fresh or recycled air enters unit 16 through ducts 30 or 31, respectively. Any water particles remaining in the air contact baffles 43 and are removed. Residual paint particles are trapped by bag filters 43a and 43b. Water condensate is removed by dehumidifier 44. Finally, heater 45 reheats the air and recirculation fans 46a and 46b send the air back to the spray booth.

Particular advantages of decreased required booth height and low power requirements are achieved by locating the air supply housing unit entirely within the booth and adjacent the recirculation water receiving tank 15, such that booth air is processed and exhausted at an elevation in the booth below the water held in the recirculation tank 15. Alternatively, the recirculation tank 15 could be placed outside the spray booth, but at an elevation with respect to the booth such that the tank is located entirely above a surface which supports the spray booth bottom.

Figure 4:
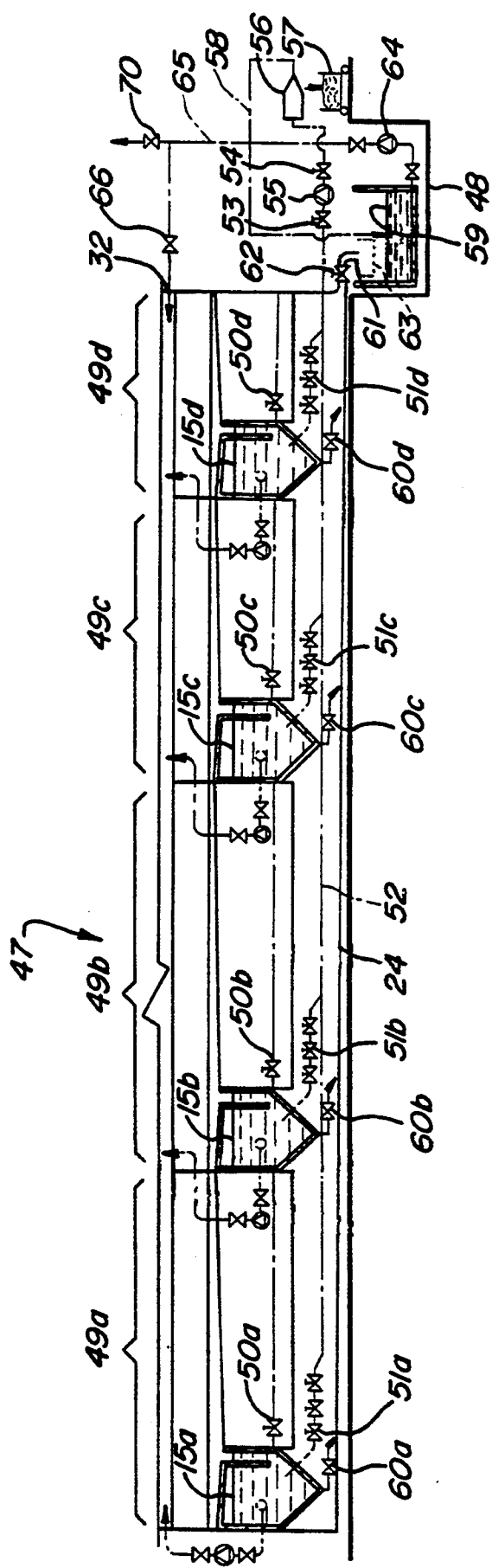
FIG. 4 is a side view of the total spray booth bottom tank length and secondary dewatering arrangement.

Referring to FIG. 4, total spray booth bottom tank length 47 is shown including desludging system 48. In the spray booth zones 49a–49d, water is recycled and air is recycled or exhausted in the manner described above with reference to FIG. 2. In addition, pipes 50a–50d are used to bleed off a portion of the water in recirculation tanks 15a–15d. Valves 51a–51d open at various times bleeding off a small fraction. These fractions are transported through pipe 52 to desludging system 48. With valves 53 and 54 open, pump 55 transports the water to centrifuge 56 where paint solids are separated and deposited in sludge cart 57. The filtered water is then transferred in pipe 58 to collection tank 59.

Periodically, large sludge sediments are drained from recirculation tanks 15a–15d by opening valves 60a–60d. The sediments flow in trough 24 and through pipe 61. Opening valve 62 allows the sediments to fall into filter basket 63 with the water filtering into collection tank 59. The contents of tank 59 are then recycled by pump 64 through pipe 65 to trough 32. This clarified water stream ensures that the concentration of paint solids in the water in trough 32 is very small.

In normal operation, valve 66 is open while valve 70 is closed, allowing the water to be recycled. Periodically (e.g., once per year), valve 70 is opened and valve 66 is closed, allowing the system to be emptied and cleaned.

Figure 5:
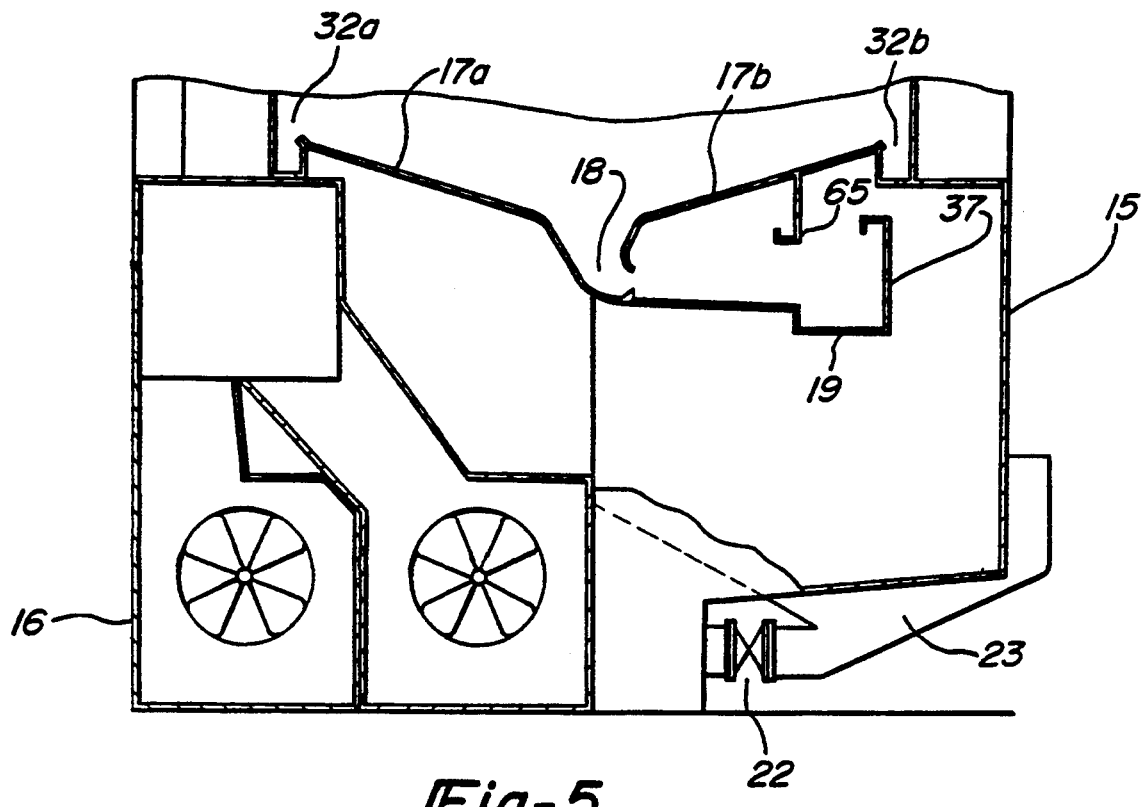
FIG. 5 is a cross-sectional view of the recirculation tank and air supply housing unit both contained in the spray booth bottom tank of FIG. 2.

FIG. 5 illustrates in detail recirculation tank 15 shown in FIG. 2, 3, and 4. Water and air enter tank 15 in a manner previously described. Not shown in prior illustrations, dewatering baffle 65 collects water and allows it to spill over into trough 19.

Figure 6:
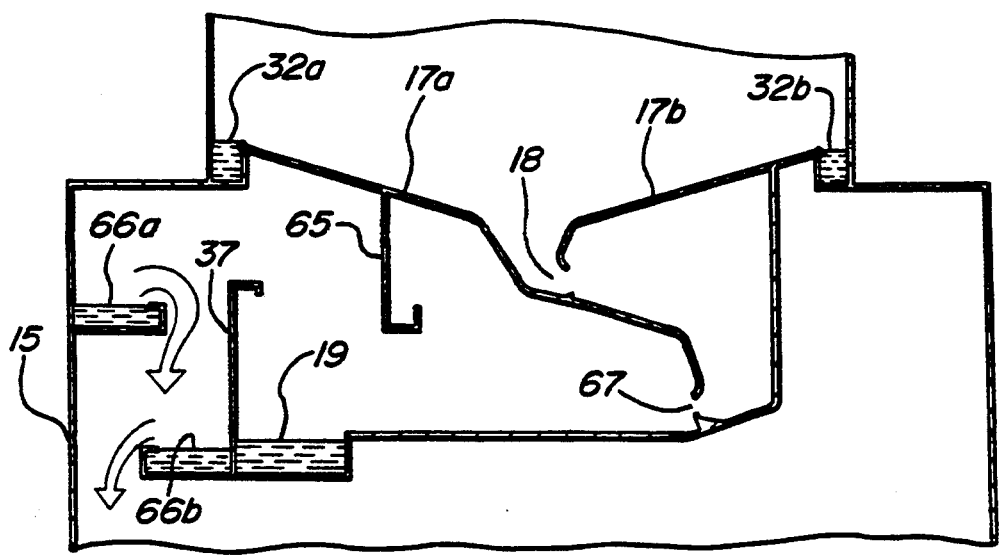
FIG. 6 is a cross-sectional view comparable to that of FIG. 5 but showing an alternate embodiment of the recirculation tank.

FIG. 6 illustrates an alternative embodiment of recirculation tank 15 in accordance with the present invention which is similar to the embodiment in FIGS. 1–5, except that dewatering baffles 66a and 66b and a second venturi scrubber 67 have been added. The additional baffles eliminate the need for a labyrinth as they capture water which flows over the top of trough 19.

I claim:

1. In a paint spray booth having an air supply system for processing air flowing through a paint spray zone in the booth, and a recirculation tank, the recirculation tank positioned beneath a scrubber for holding water exiting from a scrubber outlet, the improvement comprising:

a housing arrangement for the air supply system located at an elevation in the booth such that the air flowing through the paint spray zone in the booth is processed at an elevation in the booth below a level of water in the recirculation tank received from the scrubber.

2. The improvement of claim 1, wherein the recirculation tank is located entirely above a surface on which the paint spray booth rests.

3. The improvement of claim 1, wherein the air supply system includes means for exhausting paint spray booth air to atmosphere exterior to the booth and means for taking in fresh air from the atmosphere.

4. The improvement of claim 1, wherein the air supply system includes means for recirculating air within the paint spray booth.

5. The improvement of claim 1, wherein the air supply system includes means for optionally switching between a fresh air inlet to the system and a recirculated air inlet to the system.

6. The improvement of claim 2, wherein the air supply system includes means for exhausting paint spray booth air to atmosphere exterior to the booth and means for taking in fresh air from the atmosphere.

7. The improvement of claim 2, wherein the air supply system includes means for recirculating air within the paint spray booth.

8. The improvement of claim 2, wherein the air supply system includes means for optionally switching between a fresh air inlet to the system and a recirculated air inlet to the system.

9. A paint spray booth comprising:

a plurality of paint spray zones, each equipped with an air supply system for processing air flowing through an associated paint spray zone, and a recirculation tank, the recirculation tank positioned beneath a scrubber for holding water exiting from a scrubber outlet, the air supply system for each zone having a housing arrangement located at an elevation in the booth such that the air flowing through the associated paint spray zone in the booth is processed at an elevation in the booth below a level of water in the zone's recirculation tank received from the scrubber.

10. The paint spray booth of claim 9 wherein each recirculation tank is located entirely above a surface on which the paint spray booth rests.

* * * * *